US008815438B2

(12) United States Patent
Langhoff

(10) Patent No.: US 8,815,438 B2
(45) Date of Patent: Aug. 26, 2014

(54) ELECTRICAL CONDUCTOR FOR ENERGY STORE

(75) Inventor: Wolfgang Langhoff, Leonberg (DE)

(73) Assignee: Amphenol-Tuchel Electronics GmbH, Heilbronn (DE)

( * ) Notice: Subject to any disclaimer, the term of this patent is extended or adjusted under 35 U.S.C. 154(b) by 767 days.

(21) Appl. No.: 13/001,670

(22) PCT Filed: Mar. 20, 2009

(86) PCT No.: PCT/EP2009/002064

§ 371 (c)(1), (2), (4) Date: Mar. 31, 2011

(87) PCT Pub. No.: WO2010/012322

PCT Pub. Date: Feb. 4, 2010

(65) Prior Publication Data

US 2011/0177380 A1 Jul. 21, 2011

(30) Foreign Application Priority Data

Jul. 28, 2008 (DE) ........................ 10 2008 035 169

(51) Int. Cl.

*H01M 2/24* (2006.01)
*H01M 6/42* (2006.01)
*H01R 13/03* (2006.01)
*H01R 11/28* (2006.01)

(52) U.S. Cl.

CPC .............. *H01R 11/288* (2013.01); *H01R 13/03* (2013.01)
USPC .......................................... 429/160; 429/156

(58) Field of Classification Search

USPC .................................................. 429/160, 156
See application file for complete search history.

(56) References Cited

U.S. PATENT DOCUMENTS

| | | | |
|---|---|---|---|
| 4,932,896 A | 6/1990 | Julian | |
| 6,074,243 A | 6/2000 | Edwards | |
| 7,316,863 B2 * | 1/2008 | Sato | 429/158 |
| 8,475,954 B2 * | 7/2013 | Ijaz et al. | 429/160 |

FOREIGN PATENT DOCUMENTS

| | | | |
|---|---|---|---|
| DE | 19907498 | A1 | 8/2000 |
| DE | 102004062676 | A1 | 6/2006 |
| JP | 2005-235638 | A | 9/2005 |
| JP | 2007-073266 | A | 3/2007 |
| JP | 2007-323952 | A | 12/2007 |
| WO | 2006/067166 | A2 | 6/2006 |

OTHER PUBLICATIONS

International Preliminary Examination Report issued on Sep. 28, 2009, in International Patent Application No. PCT/US2009/002064, 4 pages.

* cited by examiner

*Primary Examiner* — Patrick Ryan
*Assistant Examiner* — Julian Anthony
(74) *Attorney, Agent, or Firm* — Blank Rome LLP

(57) ABSTRACT

The present invention relates to an electrical conductor for contacting, in parallel and/or series, a plurality of energy storage units (6) of an energy store to contacting connections (2) unmounted along the electrical conductor at a distance from each other for contacting positive poles (5') and/or negative poles (5) of the energy storage units (6), and to a corresponding energy store. Existing technical problems are solved in that flexible segments (12) are provided between the contacting connectors.

8 Claims, 2 Drawing Sheets

ELECTRICAL CONDUCTOR FOR ENERGY STORE

CROSS-REFERENCE TO RELATED APPLICATIONS

Figure 1:
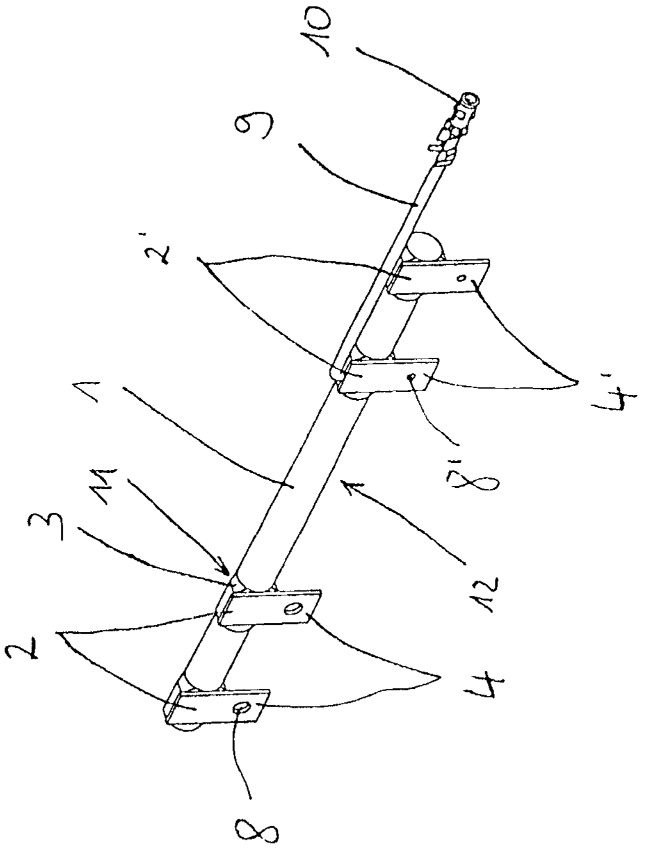

The present application claims the benefit of International Patent Application No. PCT/EP2009/002064 filed Mar. 20, 2009, which in turn claims priority to DE 10 2008 035 169.5 filed Jul. 28, 2008, the entire disclosures are incorporated by reference herein.

This invention relates to an electrical conductor for making parallel and/or serial contact with several energy storage units of an energy store with contact connections which are spaced apart from one another and which are attached along the electrical conductor for making contact with the positive poles and/or negative poles of the energy storage units, and a corresponding energy store.

These energy stores are used for example in motor vehicles, especially with electric and hybrid drives. The energy stores conventionally consist of several cells which are electrically connected. In particular for hybrid vehicles, very many cells must be connected both in parallel (to increase capacitance) and also in series (to increase voltage). With the required compact construction of the energy store major temperature fluctuations occur during operation of the energy store, especially since the ambient temperature in motor vehicles is likewise subjected to major fluctuations.

Moreover there is the technical problem that considerable line cross sections must be provided as a result of the high currents.

Another technical problem is the vibrations and impacts which occur during the operation of motor vehicles.

Therefore the object of the invention is to devise an electrical conductor and a corresponding energy store with which in spite of the aforementioned technical problems reliable operation with optimum material use and moreover simple mounting with minimum possible fault susceptibility are ensured.

This object is achieved with the features of the Claims. Advantageous developments of the invention are given in the dependent claims. The framework of the invention also encompasses all combinations of at least two of the features given in the specification, the claims, and/or the figures. In the specified value ranges, values which lie within the indicated limits will also be disclosed as boundary values and they are to be claimed in any combination.

The invention is based on the idea of providing a flexible connection system or a flexible electrical conductor with which component tolerances can be equalized and changes in length due to temperature fluctuations can be compensated; this can be achieved by flexible sections between the contact-making connections. Preferably the sections are therefore produced exclusively from flexible material and do not have rigid components. The flexible sections are advantageously longer than the sections of the contact-making connections, especially at least twice, preferably five times as long.

In one advantageous configuration of the invention the energy storage units are made as battery cells and the energy store is made as a battery block.

In another configuration of the invention the contact-making connections are made as small contact-making plates.

On the one hand, a large cross section can be implemented and the flexibility in the region of the flexible sections is ensured by the litz wire which is easy to bend by the electrical conductor being made as an especially uninsulated litz wire. Omitting the jacketing yields the maximum possible flexibility.

Advantageously the contact-making connections, especially for parallel connections, have a smaller line cross section than the electrical conductor, by which the installation space in the region of the cell connections can be kept as small as possible.

To the extent the contact-making connections for connection to the positive pole are formed from a material, especially aluminum, which is other than the material, especially copper or nickel-coated steel, of the contact-making connections for connection to the negative pole, on the one hand high quality contact-making is achieved and due to the minimum possible corrosion problems in the combination of metals with unequal electrochemical voltage potential, long service life of the contact-making connections is ensured. Advantageously the small contact-making plates are made of roll-bonded strip. An embodiment is especially preferable in which the contact-making connections can be welded to the positive pole and/or the negative pole.

In another alternative embodiment, the contact-making connections have a positive pole connection side and a negative pole connection side, the positive pole connection side being formed from a material, especially aluminum, other than the material, especially copper, of the negative pole connection side. In this way, only one type of contact-making connection need be produced; this benefits the production costs of the contact-making connections.

The technical measure that the contact-making connections are attached to the electrical conductor or a litz wire by joining sites in the form of nonpositive connections, especially weld or crimp connections, ensures a connection between the electrical conductor and the contact-making connections which is reliable even with strong vibrations and/or impacts. To the extent at the same time material linking of the contact-making connections to the positive pole and/or negative pole of the energy storage units takes place, preferably by welding, a disruption by breaking the electrical connection is essentially precluded. In this application, laser or ultrasonic welding is regarded as an especially effective welding technology, preferably the transition to the energy storage units taking place by laser welding and the contact-making connections to the line, especially a litz wire, taking place by ultrasonic welding. This yields a uniform connection with minimum or the smallest possible contact resistance.

Advantageously, at one of the joining sites there is a cell voltage tap conductor, especially welded on at the same time, in order to obtain reliable and noise-free information about the state of each energy storage unit in a charging process and during operation.

Other advantages, features and details of the invention will become apparent from the following description of preferred exemplary embodiments and using the drawings.

Figure 2:
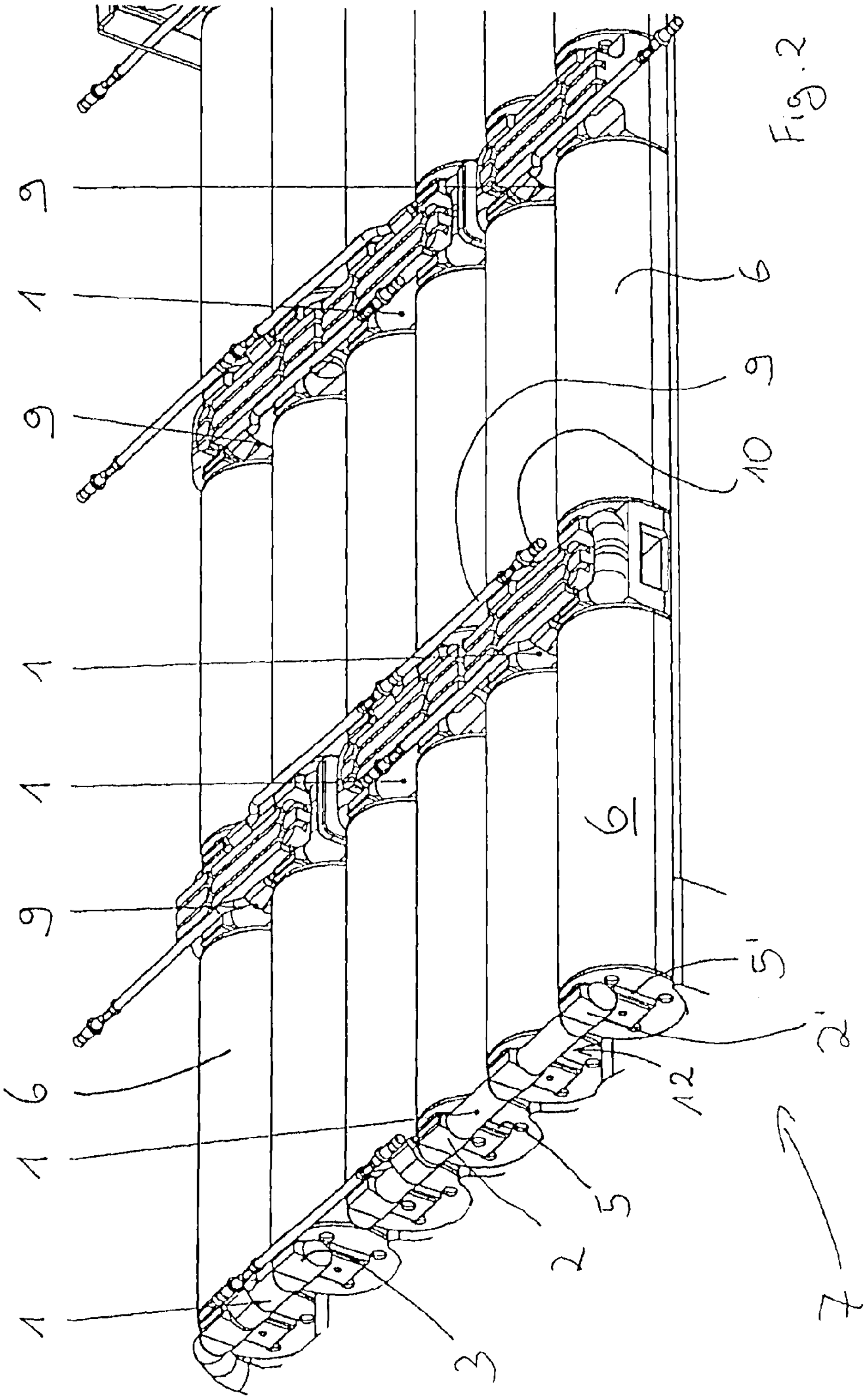

FIG. 1 shows a perspective view of one extract of an electrical conductor as claimed in the invention and FIG. 2 shows a perspective view of one extract of an energy store as claimed in the invention.

FIG. 1 shows an extract of an electrical conductor as claimed in the invention, consisting of a litz wire 1, which consists of thin individual wires, and therefore is an electrical conductor which is easy to bend. Neither the individual wires of the litz wire 1 (up to several thousand) nor the litz wire 1 as such are surrounded by an insulating jacket, but are laid uninsulated.

Along the litz wire 1 small contact-making plates 2, 2' are joined by joining sites 3, as a result of which permanent and intimate electrical contact is established between the small contact-making plates 2, 2' and the litz wire 1.

The small contact-making plates 2, 2' are electrically connected by way of attachment sections 4, 4' to the poles 5, 5' of the battery cells 6 of the battery block 7, which poles are shown in FIG. 2, by welding them on.

To identify the polarity of the poles 5, 5' and for correspondingly correct connection of the small contact-making plates 2, 2' to the positive pole 5' and the negative pole 5, there are identification means 8, 8', especially in the form of holes of different diameter, on the attachment sections 4, 4'.

The cell voltage of each group of cells 6 which are connected by a litz wire 1 can be tapped by cell voltage tap conductors 9 which are joined to the litz wire 1, as a result of which individual evaluation of the groups of battery cells 6 is possible. The connection of the cell voltage tap conductor 9 takes place advantageously by a connection 10 which is preferably made as a RADSOK plug.

Between the contact-making sections 11 or the joining sites 3 there are flexible connections 12 which are formed here by the litz wire 1 itself since the configuration as a litz wire 1 and without precompacting of the litz wire in the flexible regions 12 ensures the flexibility of the flexible regions 12 so that tolerance equalization in all directions of the coordinate system, even along the litz wire 1, is possible.

Space-saving accommodation of the electrical conductor which is especially advantageous for installation is implemented by the configuration of the small contact-making plates 2, 2' as rectangular plates with attachment sections 4, 4' which project over the litz wire 1.

The attachment sections 4 which are welded to the negative poles 5 are advantageously formed from copper or nickel-plated steel, while the attachment sections 4' which are welded to the positive poles 5' of the battery cells 6 are advantageously formed from aluminum, so that the negative pole 5 and the positive pole 5' of the battery cells 6 consist of materials which correspond thereto.

Likewise, the connection of the energy store as shown in FIG. 2 can advantageously take place by RADSOK plugs/sockets.

Alternatively the contact-making plates 2, 2' can be formed with a positive pole connection side and a negative pole connection side which is located opposite.

REFERENCE NUMBER LIST

1 litz wire
2, 2' contact-making plates
3 joining sites
4, 4' attachment sections
5, 5' poles (negative pole, positive pole)
6 battery cells
7 battery block
8, 8' identification means
9 cell voltage tap conductor
10 connection
11 contact-making section
12 flexible section

The invention claimed is:

1. Electrical conductor for making parallel and/or serial contact with several energy storage units of an energy store with contact connections which are spaced apart from one another and which are attached along the electrical conductor for making contact with the positive poles and/or negative poles of the energy storage units, flexible sections being provided between the contact-making connections wherein the contact-making connections have a positive pole connection side and a negative pole connection side, the positive pole connection side being formed from a material other than the material of the negative pole connection side, wherein the electrical conductor is an uninsulated litz wire.

2. Electrical conductor as claimed in claim 1, wherein the energy storage units are made as battery cells and the energy store is made as a battery block.

3. Electrical conductor as claimed in claim 1, wherein the contact-making connections are made as contact-making plates.

4. Electrical conductor as claimed in claim 1, wherein the contact-making connections have a smaller cross section than the litz wire of said electrical conductor.

5. Electrical conductor as claimed in claim 1, wherein the positive pole connection side is formed from aluminum and the negative pole connection side is formed from copper.

6. Electrical conductor as claimed in claim 1, wherein the contact-making connections are attached by joining sites.

7. Electrical conductor as claimed in claim 6, wherein there is a cell voltage tap conductor at one of the joining sites of said electrical conductor.

8. Energy store, especially for hybrid vehicles, consisting of several energy storage units, the energy storage units being electrically connected to one another in parallel and/or in series by electrical conductors according to claim 1.

* * * * *